(12) United States Patent
Massarwa et al.

(10) Patent No.: US 11,461,895 B2
(45) Date of Patent: Oct. 4, 2022

(54) AUTOMATIC IDENTIFICATION AND PROCESSING OF ANATOMICAL STRUCTURES IN AN ANATOMICAL MAP

(71) Applicant: BIOSENSE WEBSTER (ISRAEL) LTD., Yokneam (IL)

(72) Inventors: Fady Massarwa, Baka Al Gharbiyya (IL); Assaf Cohen, Kiryat Bialik (IL); Natan Sharon Katz, Atlit (IL); Lior Zar, Poria Illit (IL); Akram Zoabi, Haifa (IL); Ido Ilan, Yokneam (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 97 days.

(21) Appl. No.: 17/009,715

(22) Filed: Sep. 1, 2020

(65) Prior Publication Data
US 2022/0067925 A1    Mar. 3, 2022

(51) Int. Cl.
*G06T 7/00*        (2017.01)
*G06T 7/62*        (2017.01)
*G06T 7/11*        (2017.01)

(52) U.S. Cl.
CPC ............. *G06T 7/0012* (2013.01); *G06T 7/11* (2017.01); *G06T 7/62* (2017.01); *G06T 2207/10081* (2013.01); *G06T 2207/30048* (2013.01)

(58) Field of Classification Search
CPC ................................ A61B 34/20; A61B 34/25
See application file for complete search history.

(56) References Cited

U.S. PATENT DOCUMENTS

| 5,421,331 | A  | * | 6/1995  | Devito  | G06T 7/64 |
|           |    |   |         |         | 382/128   |
| 8,184,888 | B2 | * | 5/2012  | Lu      | G06T 7/0012 |
|           |    |   |         |         | 382/131   |
| 8,576,235 | B1 | * | 11/2013 | Sumner  | A63F 13/5258 |
|           |    |   |         |         | 345/473   |
| 9,934,617 | B2 | * | 4/2018  | Koyrakh | G06T 19/00 |
| 10,198,876| B2 | * | 2/2019  | Koyrakh | A61B 5/287 |
| 2007/0109299 | A1 | * | 5/2007 | Peterson | G06T 17/20 |
|           |    |   |         |         | 345/423   |

(Continued)

FOREIGN PATENT DOCUMENTS

| EP | 3843039 A1  |   | 6/2021  |             |
| EP | 3961564 A1  | * | 3/2022  | G06T 7/0012 |

OTHER PUBLICATIONS

M. E. Rettmann, D. R. Holmes III, D. L. Packer, R. A. Robb, "Identification of left pulmonary vein ostia using centerline tracking," Proc. SPIE 7262, Medical Imaging 2009: Biomedical Applications in Molecular, Structural, and Functional Imaging, 726228 (Feb. 27, 2009) (Year: 2009).*

(Continued)

*Primary Examiner* — Gandhi Thirugnanam
(74) *Attorney, Agent, or Firm* — Dergosits & Noah LLP; Todd A. Noah

(57) ABSTRACT

A method includes calculating a medial-axis tree graph of a volume of an organ of a patient in a computerized anatomical map of the volume. A predefined number of major branches in the tree graph are identified. Using the identified major branches, one or more known anatomical opening regions of the volume are identified in the anatomical map.

18 Claims, 6 Drawing Sheets

(56) References Cited

U.S. PATENT DOCUMENTS

| | | | | |
|---|---|---|---|---|
| 2008/0044072 | A1* | 2/2008 | Kiraly | G06V 10/267 |
| | | | | 382/128 |
| 2008/0183073 | A1* | 7/2008 | Higgins | A61B 6/469 |
| | | | | 600/425 |
| 2008/0273777 | A1* | 11/2008 | Luboz | G06T 7/64 |
| | | | | 382/130 |
| 2009/0156895 | A1* | 6/2009 | Higgins | G06T 19/003 |
| | | | | 600/117 |
| 2010/0310146 | A1* | 12/2010 | Higgins | G06T 7/162 |
| | | | | 345/419 |
| 2015/0018698 | A1* | 1/2015 | Safran | G06F 17/11 |
| | | | | 600/508 |
| 2015/0164356 | A1* | 6/2015 | Merschon | A61B 5/318 |
| | | | | 600/374 |
| 2016/0055681 | A1* | 2/2016 | Koyrakh | A61B 5/25 |
| | | | | 345/427 |
| 2017/0068796 | A1* | 3/2017 | Passerini | A61B 34/10 |
| 2017/0258433 | A1* | 9/2017 | Gulsun | A61B 6/5217 |
| 2018/0211438 | A1* | 7/2018 | Gonzalez Aguirre | G06T 17/00 |
| 2020/0065983 | A1* | 2/2020 | Cohen | G06T 7/11 |
| 2021/0201493 | A1* | 7/2021 | Auerbach | G16H 30/40 |
| 2022/0067925 | A1* | 3/2022 | Massarwa | G06T 7/0012 |
| 2022/0079462 | A1* | 3/2022 | Massarwi | A61B 5/0084 |

OTHER PUBLICATIONS

Yang, G., Kitslaar, P., Frenay, M. et al. Automatic centerline extraction of coronary arteries in coronary computed tomographic angiography. Int J Cardiovasc Imaging 28, 921-933 (2012). (Year: 2012).*

European Search Report for corresponding EPA No. 21194036.6 dated Feb. 1, 2022.

Matthias Hoffman et al., "Automatic Detection of Ostia in the Left Atrium", Informatik Aktuell, Jan. 1, 2016, pp. 224-229.

Tobon-Gomez Catalina et al., "Left Atrial Segmentation Challenge: A Unified Benchmarking Framework", Advances in Biometrics, Sep. 26, 2013, pp. 1-13.

* cited by examiner

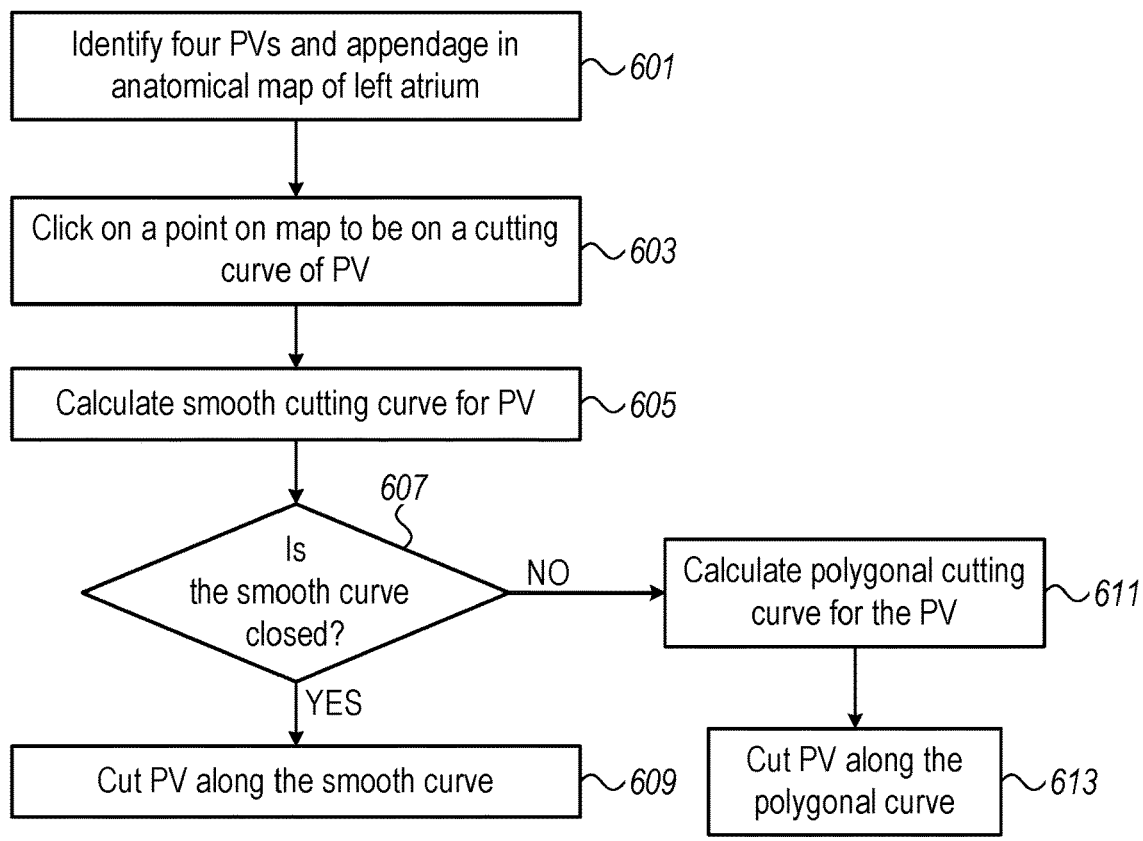
FIG. 6
FIG. 7
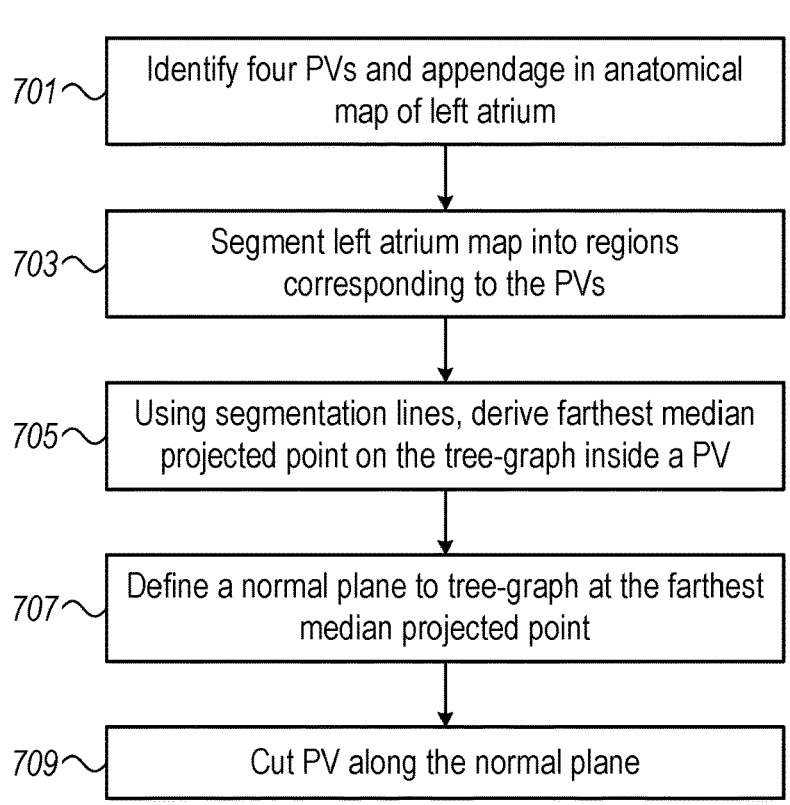

AUTOMATIC IDENTIFICATION AND PROCESSING OF ANATOMICAL STRUCTURES IN AN ANATOMICAL MAP

FIELD OF THE INVENTION

The present invention relates generally to cardiac mapping, and particularly to analyzing anatomical cardiac maps.

BACKGROUND OF THE INVENTION

Some clinical procedures employ techniques for the analysis of a computerized anatomical map of an organ. For example, U.S. Patent Application Publication No. 2020/0065983 describes a method including calculating a center-of-mass of a volume of an organ of a patient in a computerized anatomical map of the volume. A location is found on the anatomical map, on a surface of the volume, that is farthest from the center-of-mass. The location is identified as a known anatomical opening of the organ. In an embodiment, the location comprises calculating paths from the center-of-mass to multiple locations on the surface of the volume, and finding a longest path among the multiple paths. In another embodiment, the organ is a cardiac chamber and the opening is that of a pulmonary vein.

As another example, U.S. Patent Application Publication No. 2008/0044072 describes a method for labeling connected tubular objects within segmented image data, including receiving segmented image data, and labeling the segmented image data to identify a plurality of components in the segmented image data. The labeling includes: processing the segmented image data to create a processed image that represents centerline and radii estimates of the connected tubular components; determining seed point candidates in the processed image that are within a band of radii; grouping the candidates based on their physical distance from each other and their radii estimates; partitioning the segmented image data in accordance with the grouped candidates; and assigning a separate color label to each of the plurality of components that are different from each other. The specific models of expected anatomy can be used for automatic identification of the arterial and venous trees.

U.S. Patent Application Publication No. 2008/0273777 describes methods and apparatus for generating a network of endoluminal surfaces by defining a set of medial axes for a tubular structure, defining a series of cross sections along medial axis in the set of medial axes, generating a connectivity graph of the medial axes, defining multiple surface representations based upon the graph of the medial axes and the cross sections, computing a volume defined by a first one of the surface representations, defining a partition of the medial axis, cross-sections, surface and/or volume representations, and outputting the network of endoluminal surfaces.

U.S. Patent Application Publication No. 2007/0109299 describes, among other things, systems and methods for efficiently using surface data to calculate a characteristic path of a virtual three-dimensional object. A surface mesh is constructed using segmented volumetric data representing the object. Geodesic distance from a reference point is calculated for each shape element in the surface mesh. The geodesic distance values are used to produce rings. Ring centroids are computed and connected to form the characteristic path, which is optionally pruned and smoothed.

SUMMARY OF THE INVENTION

An embodiment of the present invention that is described hereinafter provides a method including calculating a medial-axis tree graph of a volume of an organ of a patient in a computerized anatomical map of the volume. A predefined number of major branches in the tree graph are identified. Using the identified major branches, one or more known anatomical opening regions of the volume are identified in the anatomical map.

In some embodiments, the volume includes a left atrium of a heart, and the one or more identified opening regions include ostia of pulmonary veins.

In some embodiments, calculating the medial-axis tree graph includes calculating a medial-axis skeleton graph of the volume, and defining a center point of the medial-axis skeleton graph as a root of the medial-axis tree graph.

In an embodiment, identifying the major branches includes removing minor and circular branches from the tree graph.

In another embodiment, identifying the one or more known anatomical opening regions includes identifying the opening regions based on posterior-anterior orientations and depths of the opening regions in the anatomical map.

In some embodiments, the method further includes presenting the one or more identified opening regions to a user on the anatomical map.

In some embodiments, the method further includes deriving, in the anatomical map, a cutting curve of an identified known anatomical opening region, and cutting, in the anatomical map, the identified known anatomical opening region along its derived cutting curve.

In an embodiment, deriving the cutting curve on the anatomical map includes selecting a point on the map to be included in the cutting curve and using the selected point in deriving the cutting curve. In another embodiment, the derived cutting curve on the anatomical map is one of a smooth cutting curve and a polygonal cutting curve. In yet another embodiment, deriving the cutting curve on the anatomical map includes (i) segmenting the opening region on the map, (ii) using the segmented opening region, derived at a farthest median projected point on the major branch of the opening region, and (iii) a normal plane to the major branch is defined at the farthest median projected point. An intersection between the opening region and the normal plane is defined as the cutting curve.

In some embodiments, defining the intersection includes, using the normal plane, deriving on the anatomical map one of a smooth cutting curve and a polygonal cutting curve.

There is additionally provided, in accordance with another embodiment of the present invention, a system, including a memory and a processor. The memory is configured to hold a computerized anatomical map of a volume of an organ of a patient. The processor is configured to (a) calculate a medial-axis tree graph of the anatomical map, (b) identify a predefined number of major branches in the tree graph, and (c) using the identified major branches, identify in the anatomical map one or more known anatomical opening regions of the volume.

BRIEF DESCRIPTION OF THE DRAWINGS

The present invention will be more fully understood from the following detailed description of the embodiments thereof, taken together with the drawings in which:

FIG. 6 is a flow chart that schematically illustrates a semi-automatic method of cutting a pulmonary vein (PV) from the surface mesh map of FIG. 2, in accordance with an exemplary embodiment of the present invention; and FIG. 7 is a flow chart that schematically illustrates an automatic method of cutting a pulmonary vein (PV) from the surface mesh map of FIG. 2, in accordance with an exemplary embodiment of the present invention.

DETAILED DESCRIPTION OF EMBODIMENTS

Overview

Figure 1:
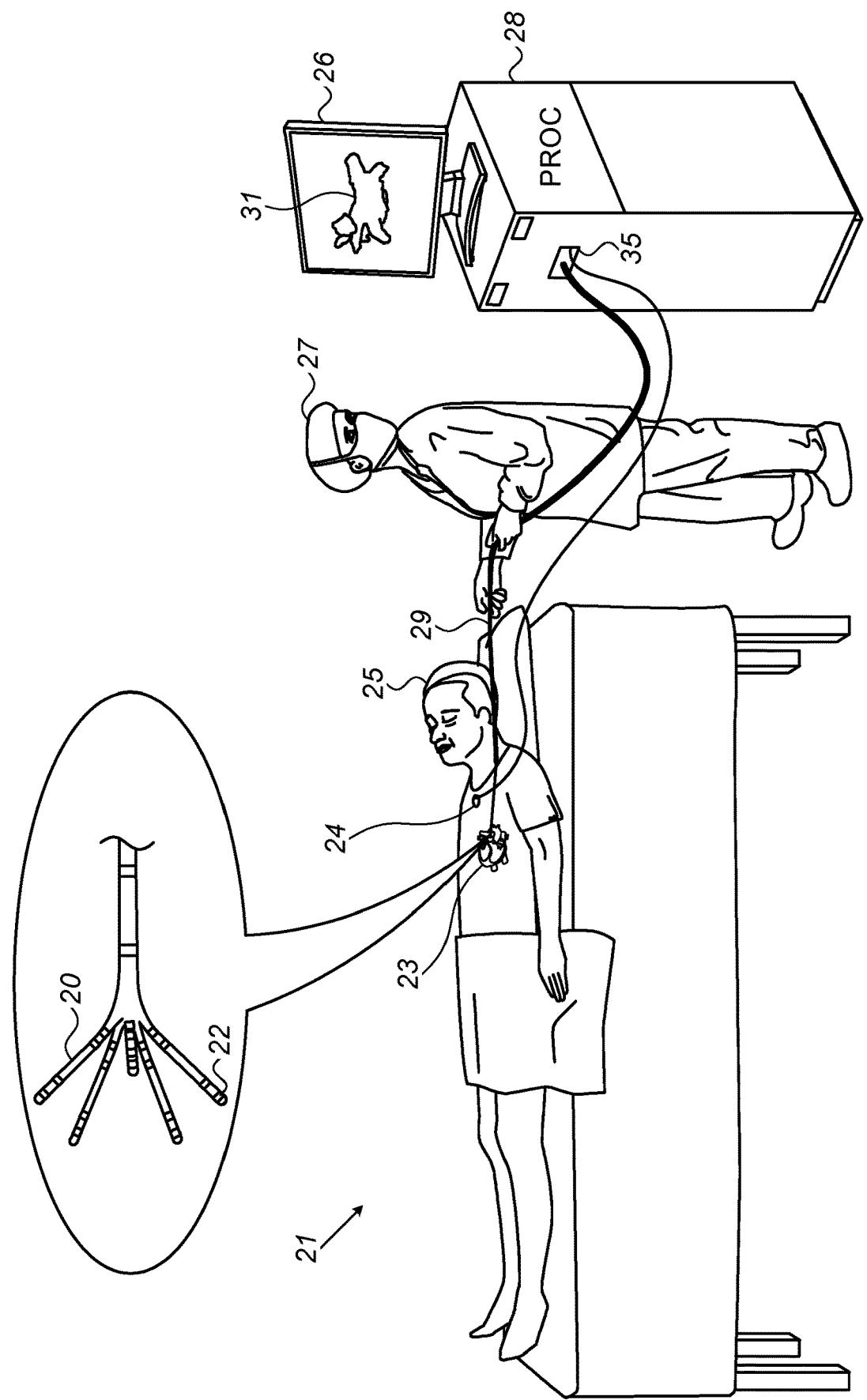
FIG. 1 is a schematic, pictorial illustration of a system for electro-anatomical mapping, in accordance with an exemplary embodiment of the present invention.

Catheter-based anatomical mapping techniques may produce a computerized anatomical map of a cavity (e.g., surface of a volume) of an organ. In some cases, the mapping technique is not aware of anatomical openings or passages in the volume. For example, mapping of a left atrium (LA) of a heart may not denote the ostia of the four pulmonary veins (PVs) and the passage to the left atrium appendage (LAA). Thus, the identification of features (e.g., opening regions) in such maps with known anatomical structures may require input from a trained, qualified person, such as a radiologist or cardiologist, to identify certain anatomical landmarks in the mapped volume that hint at an opening, such as, for example, openings in a map of the LA based on landmarks of ostia of the PVs. As another example, coherent coloring algorithms also require cutting the PVs from the left atria geometry for producing accurate coloring.

Moreover, an anatomical map of an organ is typically presented as if the organ is viewed from the outside. Physicians understand such maps, and in particular find it easy to recognize the LA showing the four PVs and the LAA, and manage to identify the veins and the appendage. However, future anatomical maps may present a view of the LA from inside the atrium, and this new type of view may make it difficult for physicians to identify the different aforementioned parts.

Some embodiments of the present invention that are described herein provide methods for automatically finding and denoting opening regions in a computerized anatomical map of a volume (e.g., cavity) of an organ of a patient. The embodiments described herein refer mainly to the LA, but the disclosed techniques can be used for mapping and visualization of other cardiac chambers, and other organs in general.

In some embodiments, a processor receives an anatomically mapped volume of a LA of a heart, and automatically identifies the PVs and the appendage opening regions on the anatomical map of the LA. To this end, the processor computes a medial axis graph (also called hereinafter in brief "skeleton") from the anatomical map. A point on a medial axis of a volume can be defined as point in a planar cross section of the volume having more than one closest point on a resulting boundary in 2D in the cross-sectional plane. Originally referred to as "topological skeleton," it was introduced in 1967 as a tool for biological shape recognition.

The processor then performs the following steps:

1. Simplifies the medial axis graph to include only "major" branches. A major branch is defined as an open-ended curve of the graph that starts at an intersection of curves of the of the graph, and is one of a predefined number of longest branches. An additional possible definition is by the angle between branches, with the angle between two major branches being larger than a predefined threshold.

If the anatomy is known, such as of an LA, the process of identifying major branches is simpler, as the expected graph topology is known (for LA, three branches on the left and two on the right, and three junctions in the intersections).

A major branch is left in the graph after the processor simplifies the graph by removing "minor" branches and/or circular sections from the graph. Minor branches are thus open-ended lines of the graph, that are too short to be part of the predefined number of branches. In case short branches are present in the middle of the graph, i.e., not-open ended ones, these branches are removed or merged with a larger branch. The predefined number of major branches is known from the anatomy of the volume. For LA this number is typically five (5). Note, the valves are part of the LA body, and are not recognized/represented in the skeleton.

2. Defines a hierarchical tree graph in which a center point of the medial axis graph is defined as the tree graph root, intersections of the medial axis graph are defined as vertices (nodes), and medial-axis sections between intersections (or between an intersection and an open end) are defined as arcs. The major branches are therefore lowest-level remaining arcs of the tree graph that have open ends.

3. Identifies five major branches of the tree graph.

4. Rotates the map, including the skeleton, to a posterior-anterior (PA—back to front) orientation, so that the right-hand side of the view corresponds to the right-hand side of the viewer, and the left-hand side of the view is at the left-hand side of the viewer.

5. Identifies the two right PVs by the depth (z-coordinate value) of the end point of their major branches on a surface mesh map of the anatomical map: the right inferior pulmonary vein (RIPV) has a lower depth than the right superior pulmonary vein (RSPV).

6. Identifies the left PVs and the appendage by depth (z-coordinate value) which decreases in the following sequence: left atrium appendage (LAA), left superior pulmonary vein (LSPV), left inferior pulmonary vein (LIPV).

One of the purposes of identifying the opening regions, e.g., of PVs, in an anatomical map may be the removal of a distal portion of the opening regions (e.g., of the PVs) from the map (also called "cutting the map"). This helps the physician visualize the volume (e.g. of the LA).

In particular, the disclosed techniques may aid the physician to perform a subsequent ablation of a PV, by removing irrelevant electrophysiological (EP) information that may confuse the physician: If the PV is not removed from the map, an electrical activity will appear in an electrophysiological (EP) version of the map, for example, in a form of map coloring. This EP information, which is considered already irrelevant just before performing an ablation, may cause the physician to erroneously place an ablating catheter too deep into that PV (e.g., rather than placing the catheter at the ostium of the PV). Also, this cutting is very important in the coloring algorithms, where EA activities should not propagate to the PVs.

While cutting opening regions may be beneficial, it is very difficult to automatically define a cutting curve of the relevant anatomical structure. This is especially true for a cardiac chamber, where the anatomy between the chamber (e.g., LA) and the opening regions (e.g., of the PVs) may be complex, significantly increasing the time required. As a result, attempting to cut a PV off of the anatomical map may result in a wrong location and/or shape of the cut, and would require non-trivial work of the operator.

Some embodiments of the present invention provide methods to accurately derive a cutting curve of an identified PV on an anatomical map using a "semi-automatic" approach. To this end, the user clicks on a surface point on the LA map that should be on a proposed curve of a cut. The processor calculates another point, on the skeleton, that is closest to the surface point, and then defines a plane through the calculated point, Q, on the skeleton, which is orthogonal to the tangent of the branch at Q. The intersection of the plane with the surface map is used as a basis to derive the cutting curve for the vein that is described below. In another embodiment, another algorithm is provided for "semi-automatic" cutting, that does not rely on skeleton of the map.

In an embodiment, in case a smooth cutting curve is not well defined by the above process, for example, by being open-ended, the processor derives a best-fit polygonal cutting curve, as also described below.

In some cases, because of the complexity of the chamber, even the disclosed "semi-automatic" method may be hard to perform. Therefore, some embodiments of the present invention disclose a method to completely and automatically derive a cutting curve of an identified known anatomical opening, such as in an ostium region of a PV.

In these embodiments, a processor first segments the surface map, addresses each segmented region, and then provides a cutting curve which does not encroach on the segmentation lines around each PV branch of the skeleton, all with no input from a physician. The segmentation lines are a set of locations on the map surface that have the same distances from two or more of the map surface medial axis (skeleton) major branches, as described below.

Typically, the processor is programmed in software containing a particular algorithm that enables the processor to conduct each of the processor-related steps and functions outlined above.

The disclosed techniques use automated post-processing methods to analyze an anatomical map, which may ease the diagnostic interpretation work required by a physician. The disclosed technique may thus expedite complicated diagnostic procedures, such as those required in diagnostic catheterizations, and by so doing make the clinical diagnosis and subsequent treatment, such as catheter ablation, safer and more efficient.

System Description

FIG. 1 is a schematic, pictorial illustration of a system 21 for electro-anatomical mapping, in accordance with an exemplary embodiment of the present invention. FIG. 1 depicts a physician 27 using an electro-anatomical catheter 29 to perform an electro-anatomical mapping of a heart 23 of a patient 25. Catheter 29 comprises, at its distal end, one or more arms 20, which may be mechanically flexible, each of which is coupled with one or more electrodes 22. During the mapping procedure, electrodes 22 acquire and/or inject signals from and/or to the tissue of heart 23. A processor 28 receives these signals via an electrical interface 35, and uses information contained in these signals to construct, for example, an anatomical map 31 of a surface of a left atrium. During and/or following the procedure, processor 28 may display anatomical map 31 on a display 26.

During the procedure, a tracking system is used to track the respective locations of sensing-electrodes 22, such that each of the signals may be associated with the location at which the signal was acquired. For example, the Active Current Location (ACL) system, made by Biosense-Webster (Irvine Calif.), which is described in U.S. Pat. No. 8,456,182, whose disclosure is incorporated herein by reference, may be used. In the ACL system, a processor estimates the respective locations of the electrodes based on impedances measured between each of the sensing-electrodes 22, and a plurality of surface electrodes 24, that are coupled to the skin of patient 25. For example, three surface electrodes 24 may be coupled to the patient's chest, and another three surface electrodes may be coupled to the patient's back. (For ease of illustration, only one surface electrode is shown in FIG. 1.) Electric currents are passed between electrodes 22 inside heart 23 of the patient and surface electrodes 24. Processor 28 calculates an estimated location of all electrodes 22 within the patient's heart based on the ratios between the resulting current amplitudes measured at surface electrodes 24 (or between the impedances implied by these amplitudes) and the known positions of electrodes 24 on the patient's body. The processor may thus associate any given impedance signal received from electrodes 22 with the location at which the signal was acquired.

The exemplary embodiment shown in FIG. 1 is chosen purely for the sake of conceptual clarity. Other tracking methods can be used, such as ones based on measuring voltage signals, as with the Carto®4 system (produced by Biosense Webster). Other types of sensing catheters, such as the Lasso® Catheter (produced by Biosense Webster) may equivalently be employed. Contact sensors may be fitted at the distal end of electro-anatomical catheter 29. As noted above, other types of electrodes, such as those used for ablation, may be fitted to electrodes 22 for acquiring the needed position data and utilized in a similar way. Thus, an ablation electrode used for collecting position data is regarded, in this case, as a sensing electrode. In an optional embodiment, processor 28 is further configured to indicate the quality of physical contact between each of the electrodes 22 and an inner surface of the cardiac chamber during measurement.

Processor 28 typically comprises a general-purpose computer with software programmed to carry out the functions described herein. The software may be downloaded to the computer in electronic form, over a network, for example, or it may, alternatively or additionally, be provided and/or stored on non-transitory tangible media, such as magnetic, optical, or electronic memory.

In particular, processor 28 runs a dedicated algorithm as disclosed herein, including in FIGS. 5-7, that enables processor 28 to perform the disclosed steps, as further described below.

Post Mapping Automatic Identification of Pulmonary Veins

Figure 2:
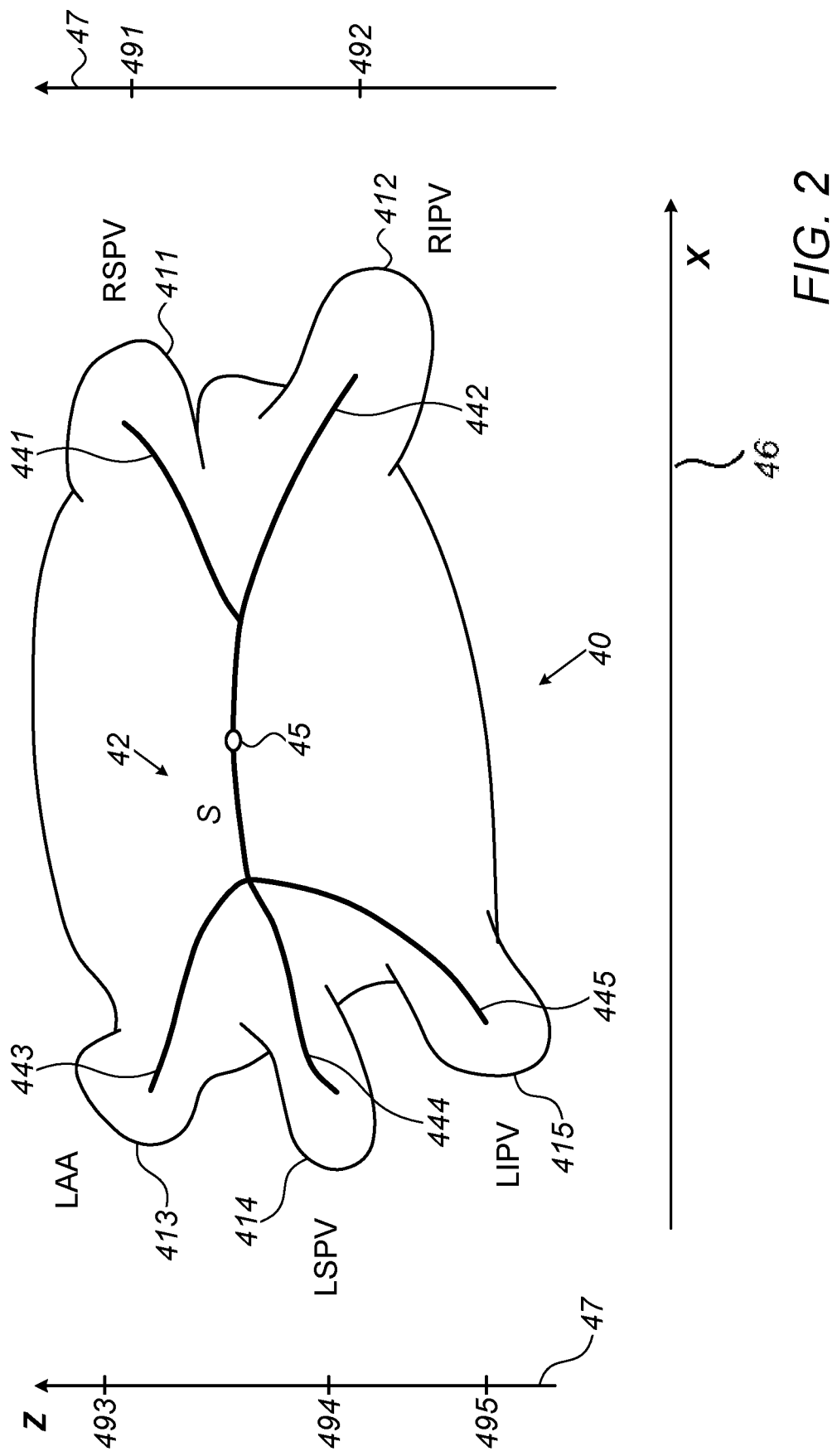
FIG. 2 is a schematic, pictorial volume rendering of a surface mesh map of a left atrium, which exemplifies automatically identified pulmonary veins (PVs) in the map, in accordance with an exemplary embodiment of the present invention.

To keep the presentation clear, the explanation of FIG. 2 (and that of FIGS. 3-4) uses a schematic mesh surface map 40 representation of anatomical map 31. Surface mesh map 40 is typically made of a triangulated mesh (triangles not shown for clarity).

FIG. 2 is a schematic, pictorial volume rendering of surface mesh map 40 of a left atrium, which exemplifies automatically identified pulmonary veins (PVs) 411-412 and 414-415 in the map, in accordance with an embodiment of the present invention.

As seen, processor 28 computed a "medial axis" skeleton S 42 from LA surface anatomical map 31. As a hierarchical tree graph, skeleton 42 has a root point $M_0$ 45. A root point $M_0$ of a tree graph splits the graph into two major sub trees where the left major branches are on the same (left) side, and the right major branches are on the same (right) side. For N predefined number of major branches, $M_0$ can be calculated as the point on the skeleton which is the closest to the point $$m'_0 = \frac{1}{4} \sum_{i \neq j}^{N} (S_i + S_j),$$

where $S_i$ is the coordinate of the end point of branch j. Skeleton (i.e., the tree graph) comprises five major branches only (N=5), branches 441-445, as the processor already removed minor or circular branches (not shown) from skeleton 42.

As further seen, surface mesh map 40 is rotated (by processor 28) to a posterior-anterior (back to front) PA orientation, so that the right of the view corresponds to the right side of the viewer, and so that the left of the view is at the left side of the patient.

The two right and two left PVs have been identified by the processor by their x-values (on an x-axis 46). Inferior and superior structures are identified by their depth value (depths are marked on depth (z-value) axes 47): right inferior pulmonary vein (RIPV) 412 has a depth 492 lower that depth 491 of right superior pulmonary vein (RSPV) 411. Similarly, the processor identified the appendage and the left PVs by their depth values. As seen, the depth values decrease for the sequence: left atrium appendage (LAA) 413 of depth 493, left superior pulmonary vein (LSPV) 414 of depth 494, and left inferior pulmonary vein (LIPV) 415 of depth 495.

Post Mapping Cutting of Pulmonary Veins

Figure 3:
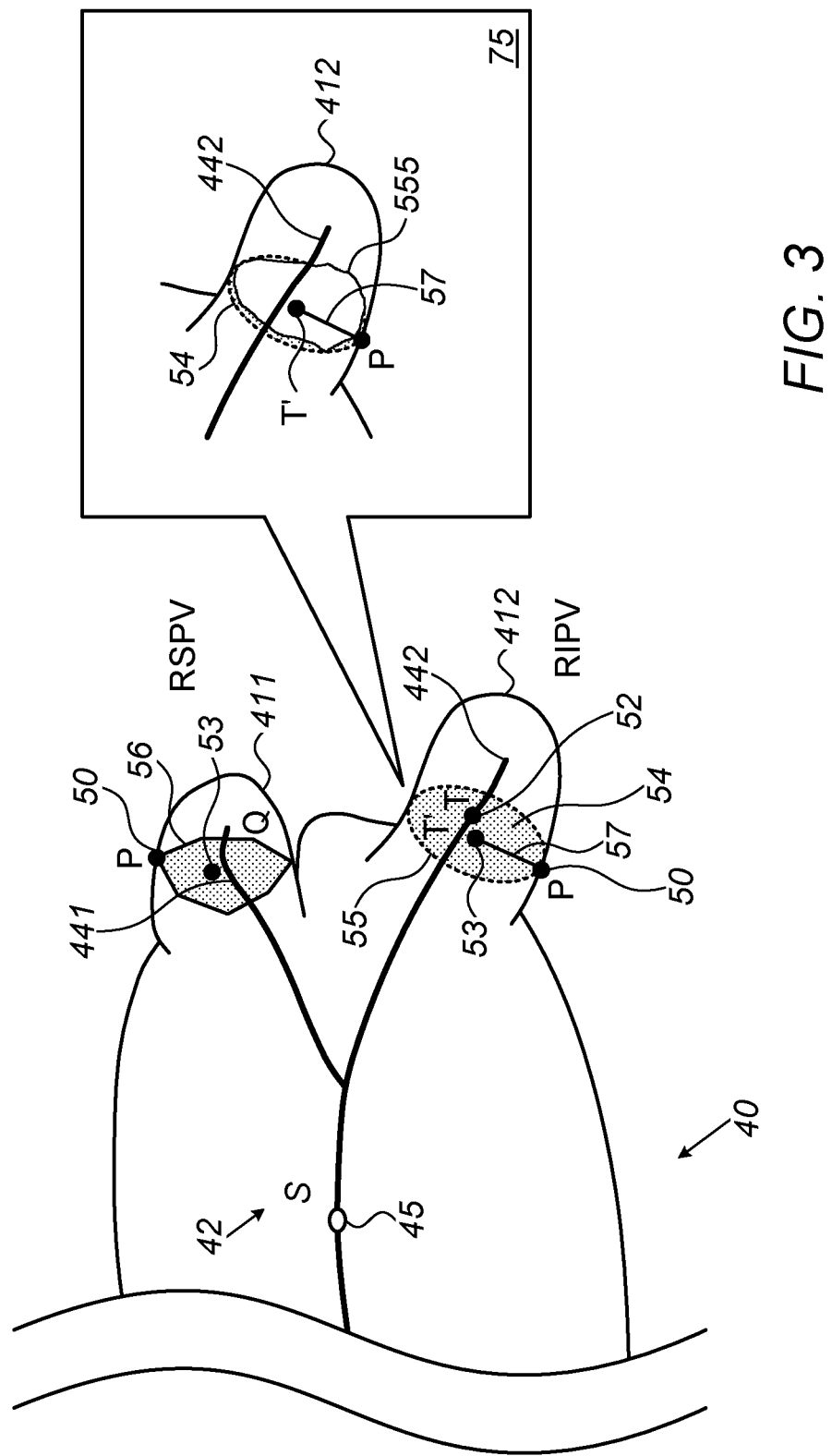
FIG. 3 is a schematic, pictorial volume rendering of semi-automatically produced cuts of pulmonary veins (PVs) in the surface mesh map of FIG. 2, in accordance with an exemplary embodiment of the present invention.

FIG. 3 is a schematic, pictorial volume rendering of semi-automatically produced cuts of pulmonary veins (PVs) 411 and 412 in surface mesh map 40 of FIG. 2, in accordance with an exemplary embodiment of the present invention.

In the shown embodiment, after PVs are identified, the user clicks on a point P 50 on the map that should be on a proposed curve of cut. The algorithm calculates another point, T 52, on skeleton S 42, that is closest to point P, and then defines a plane N (not shown) through T 52 that is normal to branch 442 of skeleton S 42 at point T 52. The intersection of plane N with the map forms a basis to find a smooth cutting curve 555 for the PV. (Curve 555 is seen in inset 75).

Finding a smooth cutting curve can be implemented in several ways. In one embodiment, for example, an algorithm may apply the following steps:
i) Define a circle 54 with radius ‖P−T'‖ 57 and a circumference 55, where point T' 53 is the projection of point T on plane N.

ii) Start from three points with equal angular distance in circle 54 and define curve 555 using the projection of these points on the mapped surface of the volume.

iii) If the curve does not close, then:
Increase the number of points and try again. or,
Add points in the middle of the geodesic path that connects each consecutive point that failed to connect.

In an embodiment, in case smooth cutting curve 555 is not well defined, for example, by being open ended, the processor derives a best fit polygonal cutting curve, as described below. For example, the processor applies an algorithm comprising the following steps for finding an intersecting plane N to cut RSPV 411:
i) Cut the map with the plane N.
ii) Define the anatomical structure boundary as the closest closed polygon Q 56 of intersection.

A closest closed polygon can be defined, by fitting a quadratic B-spline curve that interpolates the projected points on the map surface, and then sampling the smooth curve and project it on the surface to get the polygon. To this end, a metric can be used, for example, in case that sets {s} and {r} have the same number of points, as a closed polygon whose vertices' coordinates minimize a metric $M = \Sigma |r_i - \rho_i|^2$, where $r_i$ and $\rho_i$ are respective coordinates on the polygon, such as $r_i$ being its vertex, and of a respective set of points of intersection (not shown) of plane N with the surface. More generally, distances or similarities between curves can be computed using computational geometry. Therefore, any distance computation method between curves can be used here. For example, the Hausdorff distance or Frechet distance.

Figure 4:
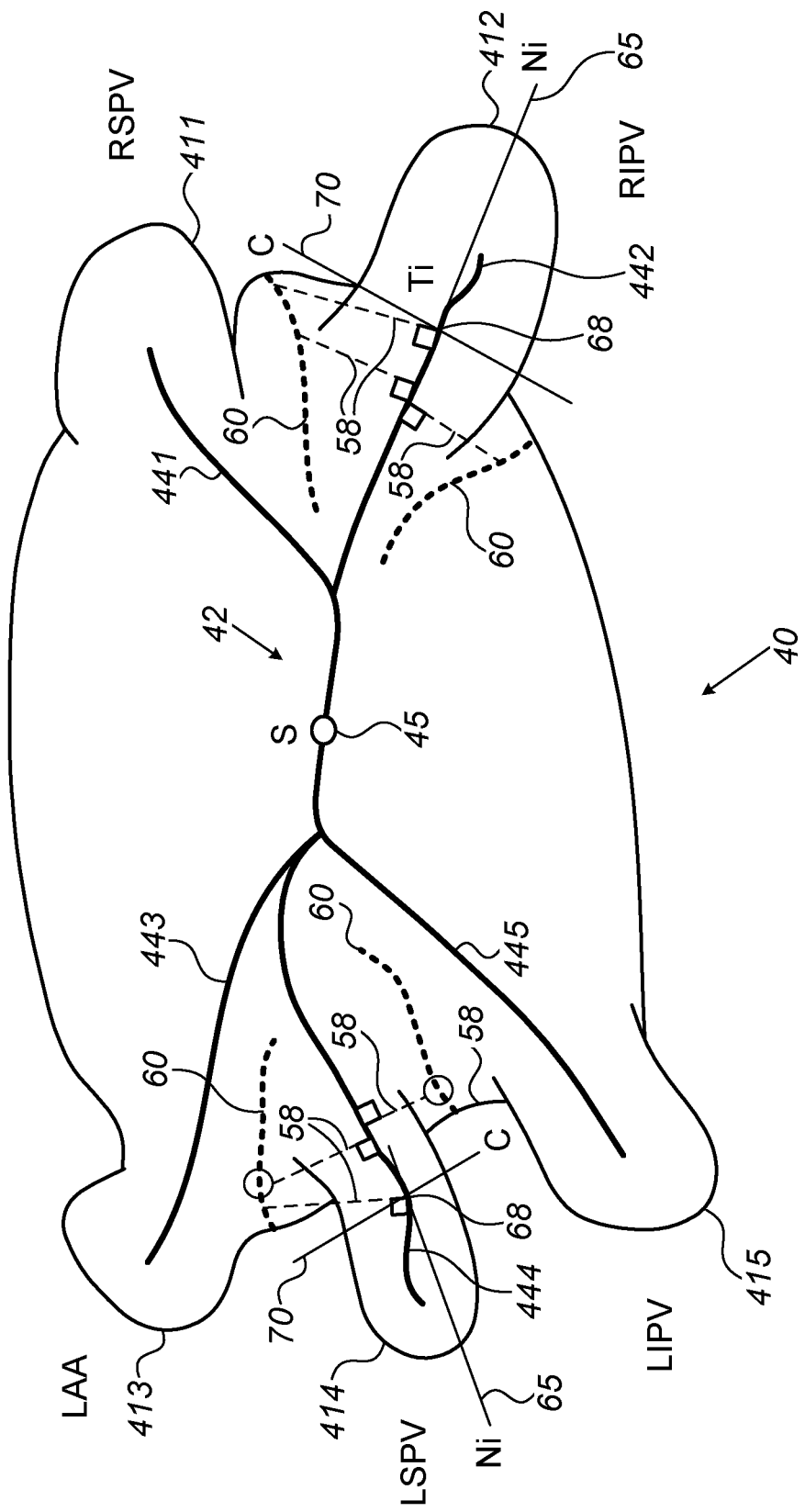
FIG. 4 is a schematic, pictorial volume rendering of automatically produced cuts of pulmonary veins (PVs) in the surface mesh map of FIG. 2, in accordance with an exemplary embodiment of the present invention.

FIG. 4 is a schematic, pictorial volume rendering of automatically made cuts 70 of pulmonary veins (PVs) in surface mesh map 40 of FIG. 2, in accordance with an exemplary embodiment of the present invention. In the shown embodiment, processor 28 derives a cutting curve according to an algorithm (after PVs have been identified, and skeleton 42 computed with major branches 441-445, as described above).

The processor 28 identifies all of surface points 60 (e.g., vertices on a triangulated mesh that represents a surface of the left atrium), to form segmentation lines which are approximately equidistant from two neighboring skeleton major branches that corresponds to anatomical structures. The neighboring skeleton branches referred to in FIG. 4 are branches 441-442, 442-445, 443-444, and 444-445. In other words, for each pair of the five lines 441-445 of the skeleton (starting from a vertex of skeleton S 42), the processor finds sets of points 60 that are equidistant from the lines, that lie on the surface, and that are furthest from the vertex. The sets of surface points 60 effectively segment the map into regions corresponding to the anatomical structures.

As used herein, the term "approximately" for any numerical value or range indicates a suitable dimensional tolerance that allows the part or collection of components to function for its intended purpose as described herein. More specifically, "approximately" may refer to the range of values ±20% of the recited value, e.g. "approximately 90%" may refer to the range of values from 71% to 99%.

Using processor 28, PVs are then automatically able to cut in map 31 by not encroaching on a line connecting points 60, as seen below:
a) Each found point 60 (that is associated with two skeleton branches) has a projected (58) point 60 on the two branches. This is correct for all of the above branch-pairs and for each surface point (e.g., vertex).

b) Each branch has a farthest (e.g., from root point 45) selected median projected (58) point Ti 68.
c) Each point Ti has a tangent Ni 65, which defines the sought-after cutting plane C 70, on which point Ti is embedded.

Taking into account each of the five branches of the skeleton, the required anatomical map, i.e., that is cut of PVs, is automatically derived. Derivation steps essential for the understanding of the embodiments are described below. Alternatively, cutting plane C 70 can be used to define a projected curve, such as curve 555 of FIG. 3, defining, in this way, a more realistic representation of the borders of the map of the anatomical structure.

Identification and Cutting Methods of PVS in an Anatomical Map

Figure 5:
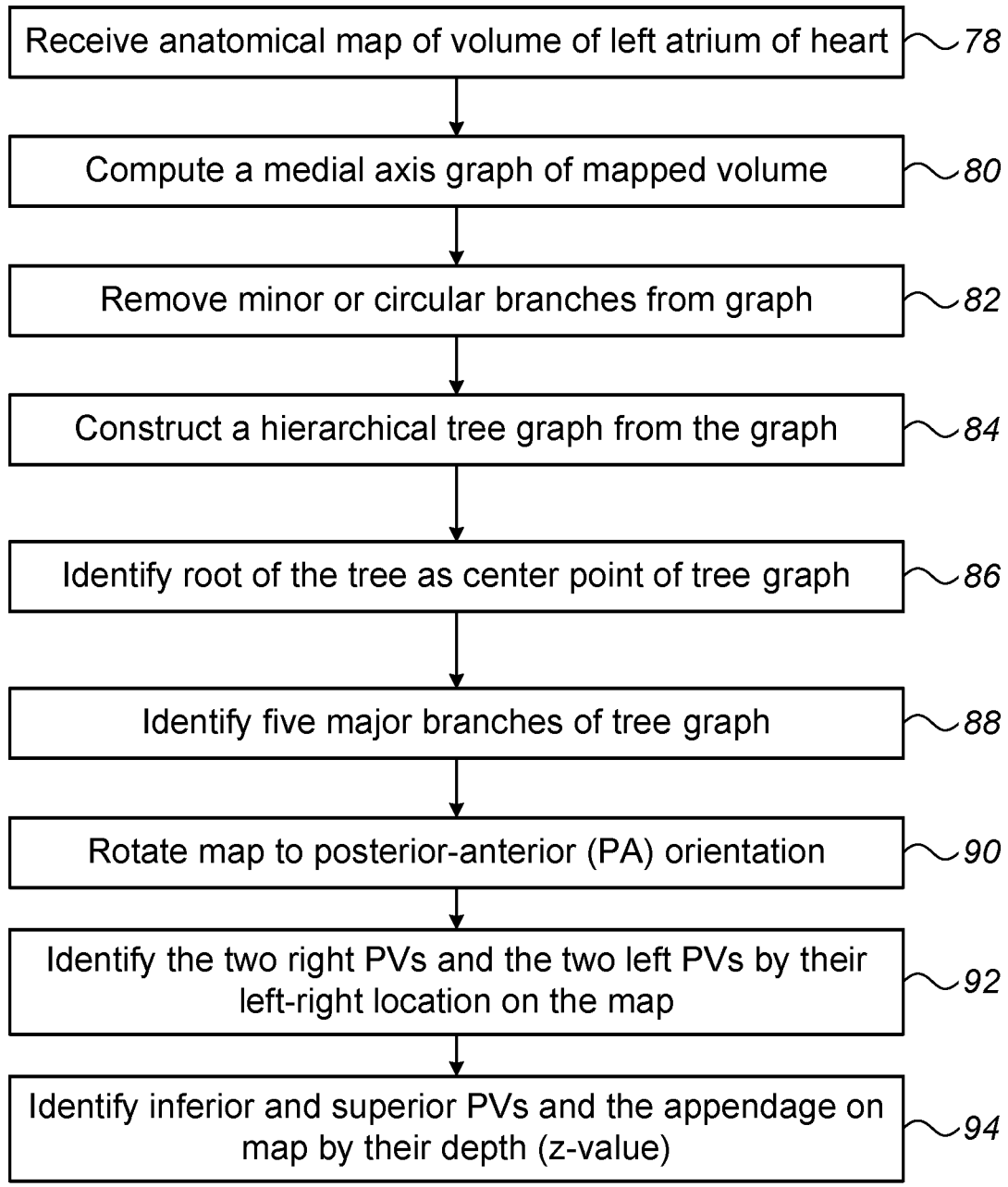
FIG. 5 is a flow chart that schematically describes a method for identifying pulmonary veins (PVs) in the surface mesh map of FIG. 2 of the left atrium, in accordance with an exemplary embodiment of the present invention.

FIG. 5 is a flow chart that schematically describes a method for identifying pulmonary veins (PVs) 411, 412, 414 and 415 in surface mesh map 40 of FIG. 2 of the left atrium, in accordance with an embodiment of the present invention. The algorithm according to the presented embodiment carries out a process that begins with processor 28 receiving a surface map of the LA of a heart 23 of patient 25, such as map 31 computed by system 21, at a map receiving step 78.

At a skeleton computing step 80, processor 28 computes a "medial axis" skeleton 42 of the mapped surface of the LA.

Next, processor 28 removes minor or circular branches from skeleton 42, at a skeleton cleanup step 82.

Next, processor 28 constructs a hierarchical tree graph 42, at a tree graph construction step 84.

The processor then identifies the tree root as center point 45 of skeleton 42, at an identification step 86.

Next, processor 28 identifies the five major branches 441-445 of the tree graph, at major branches identification step 88.

To this end, processor 28 rotates surface mesh map 40 to a posterior-anterior (back to front) PA orientation, at a map rotation step 90, to align the coordinate system such that an x axis differentiates left from right and the z axis differentiates depth (posterior-interior).

Finally, at PV identification steps 92 and 94, processor 28 identifies the two right PVs and the two left PVs by their left-right location on the map, and identifies inferior and superior PVs (and the appendage) by their depth values on surface mesh map 40, such as shown in FIG. 2, on surface mesh map 40.

FIG. 6 is a flow chart that schematically illustrates a semi-automatic method of cutting a pulmonary vein (PV) from surface mesh map 40 of FIG. 2, in accordance with an embodiment of the present invention. While the shown embodiment is provided with PVs as the anatomical structures to be cut, in general, the disclosed one-click technique is applicable to other anatomical structures of other organs, such as of other cardiac chambers, that need to be cut from their map.

In another embodiment (not shown in FIG. 6), another algorithm is provided for "semi-automatic" cutting, that does not rely on skeleton of the map.

The algorithm according to the presented embodiment carries out a process that begins at PV identification step 601, with processor 28 identifying four PVs 411, 412, 414 and 415 and the appendage in surface mesh map 40, for example, using the steps described in FIG. 5.

Next, at a surface point selection step 603, the user clicks on a point on the chamber map (e.g. on map 40), that should be on a cutting curve.

In a calculation step 605, processor 28 derives (e.g., calculates) a smooth cutting curve, such as curve 555 of FIG. 3. Then, at a checking step 607, the processor checks if the smooth cutting curve derived by the processor is closed.

If the smooth cutting curve is closed, processor 28 cuts the PV in question along the smooth curve, at a cutting step 609. If, on the other hand, the smooth curve is open-ended, processor 28 calculates a best fit polygonal cutting curve, such as curve 56 of FIG. 3, at a polygonal cutting curve derivation step 611. Then, processor 28 cuts the PV in question along the polygonal curve, at a cutting step 613.

FIG. 7 is a flow chart that schematically illustrates an automatic method of cutting a pulmonary vein (PV) from surface mesh map 40 of FIG. 2, in accordance with an embodiment of the present invention. While the shown embodiment is provided with PVs as the anatomical structures to be cut, in general, the disclosed one-click technique is applicable to other anatomical structures of other organs, such as of other cardiac chambers, that need to be cut from their map. The algorithm according to the presented embodiment carries out a process that begins at PV identification step 701, with processor 28 identifying four PVs 411, 412, 414 and 415, and the appendage, in surface mesh map 40, for example, using the steps described in FIG. 5.

Next, at a map segmentation step 703, processor 28 segments mesh map 40 with segmentation lines 60, as described in FIG. 4.

In a derivation step 705, using segmentation line 60, processor 28 calculates a farthest median projected point (e.g., points 68 of FIG. 4) inside each PV in question. Then, processor 28 defines a normal plane, such as plane of FIG. 4, to skeleton 42 at the farthest median projected point, at a cutting plane derivation step 707. Then, processor 28 cuts the PV in question along the polygonal curve, at a cutting step 709. In an embodiment, alternative to using plane 70, the processor uses the farthest median projected point as a basis for calculating a smooth cutting curve, such as curve 555, or a polygonal curve, such as curve 56, as described in FIG. 3 and steps 605-613 of FIG. 6. In other embodiments, other statistical functions can be utilized aside of a median, such as maximum, minimum, average, etc.

The example flow charts shown in FIGS. 5-7 are chosen purely for the sake of conceptual clarity. In optional embodiments, various additional steps may be performed, for example to automatically register, with medical images, the openings into the LA of the PVs that were identified and cut.

Although the embodiments described herein mainly address identification of known anatomical openings in a mapped volume, such as ostia of pulmonary veins, the methods and systems described herein can also be used in other applications. For example, the disclosed method may be utilized to identify zones in a cavity that have a disproportionate size and/or shape. While disclosed embodiments refer to cardiac applications, the disclosed method may be applied to a mapped volume of a cavity of any organ. For example, the algorithms described here can be applied to any geometry that have tubular structures, such as all the other chambers of the heart. As another example, the method can be applied to an otolaryngologic map.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for automatic identification and processing of anatomical structure in an anatomical map, comprising:
    calculating a medial-axis tree graph of a volume of an organ of a patient in a computerized anatomical map of the volume;
    identifying a predefined number of major branches in the tree graph;
    identifying, in the anatomical map, one or more known anatomical opening regions of the identified major branches of the volume;
    segmenting an identified known anatomical opening region of an identified major branch on the map;
    deriving a farthest median projected point on the identified major branch of the segmented opening region;
    defining a normal plane to the identified major branch at the farthest median projected point;
    defining an intersection between the segmented opening region and the normal plane as a cutting curve of the opening region; and
    cutting, in the anatomical map, the identified known anatomical opening region along its cutting curve.

2. The method according to claim 1, wherein the volume comprises a left atrium of a heart, and the one or more identified opening regions comprise ostia of pulmonary veins.

3. The method according to claim 1, wherein calculating the medial-axis tree graph comprises calculating a medial-axis skeleton graph of the volume, and defining a center point of the medial-axis skeleton graph as a root of the medial-axis tree graph.

4. The method according to claim 1, wherein identifying the major branches comprises removing minor and circular branches from the tree graph.

5. The method according to claim 1, wherein identifying the one or more known anatomical opening regions comprises identifying the opening regions based on posterior-anterior orientations and depths of the opening regions in the anatomical map.

6. The method according to claim 1, and comprising presenting the one or more identified opening regions to a user on the anatomical map.

7. The method according to claim 1, wherein deriving the cutting curve on the anatomical map comprises selecting a point on the map to be included in the cutting curve and using the selected point in deriving the cutting curve.

8. The method according to claim 1, wherein the derived cutting curve on the anatomical map is one of a smooth cutting curve and a polygonal cutting curve.

9. The method according to claim 1, wherein defining the intersection comprises, using the normal plane, deriving on the anatomical map one of a smooth cutting curve and a polygonal cutting curve.

10. A system for automatic identification and processing of anatomical structure in an anatomical map, comprising:
    one or more processors; and
    a non-transitory computer readable medium storing a plurality of instructions, which when executed, cause the one or more processors to:
        calculate a medial-axis tree graph of an anatomical map of a volume of an organ of a patient;
        identify a predefined number of major branches in the tree graph;
        identify in the anatomical map, one or more known anatomical opening regions of the identified major branches of the volume;
        segment an identified known anatomical opening region of an identified major branch on the map;
        derive a farthest median projected point on the identified major branch of the segmented opening region;
        defining a normal plane to the identified major branch at the farthest median projected point;
        define an intersection between the segmented opening region and the normal plane as a cutting curve of the opening region; and
        cut, in the anatomical map, the identified known anatomical opening region along its cutting curve.

11. The system according to claim 10, wherein the volume comprises a left atrium and the one or more identified opening regions are each an ostium of a pulmonary vein.

12. The system according to claim 10, wherein the processor is configured to calculate the medial-axis tree graph by calculating a medial-axis skeleton graph of the volume, and defining a center point of the medial-axis skeleton graph as a root of the medial-axis tree graph.

13. The system according to claim 10, wherein the processor is configured to identify the major branches by removing minor and circular branches from the tree graph.

14. The system according to claim 10, wherein the processor is configured to identify the one or more known anatomical opening regions based on posterior-anterior orientations and depths of the opening regions in the anatomical map.

15. The system according to claim 10, wherein the processor is further configured to present the one or more identified opening regions to a user on the anatomical map.

16. The system according to claim 10, wherein the processor is configured to derive the cutting curve by selecting a point on the map to be included in the cutting curve and using the selected point to derive the cutting curve.

17. The system according to claim 10, wherein the derived cutting curve on the anatomical map is one of a smooth cutting curve and a polygonal cutting curve.

18. The system according to claim 10, wherein the processor is further configured to, using the normal plane, derive on the anatomical map one of a smooth cutting curve and a polygonal cutting curve.

* * * * *